(12) United States Patent
Zhu et al.

(10) Patent No.: US 12,339,353 B2
(45) Date of Patent: Jun. 24, 2025

(54) SYSTEM FOR OBJECT DETECTION

(71) Applicant: KABUSHIKI KAISHA TOSHIBA, Tokyo (JP)

(72) Inventors: Xu Zhu, Kawasaki Kanagawa (JP); Hiroki Mori, Kawasaki Kanagawa (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 624 days.

(21) Appl. No.: 17/467,685

(22) Filed: Sep. 7, 2021

(65) Prior Publication Data
US 2022/0107407 A1 Apr. 7, 2022

(30) Foreign Application Priority Data

Oct. 1, 2020 (JP) .................. 2020-167005

(51) Int. Cl.
*G01S 13/90* (2006.01)
*G01S 7/04* (2006.01)
*G01S 13/32* (2006.01)
*G01S 13/56* (2006.01)
*G01S 13/86* (2006.01)

(52) U.S. Cl.
CPC ............ *G01S 13/9064* (2019.05); *G01S 7/04* (2013.01); *G01S 13/32* (2013.01); *G01S 13/56* (2013.01); *G01S 13/867* (2013.01)

(58) Field of Classification Search
CPC ........ G01S 13/9064; G01S 7/04; G01S 13/32; G01S 13/56; G01S 13/867
See application file for complete search history.

(56) References Cited

U.S. PATENT DOCUMENTS

| 9,599,705 | B2* | 3/2017 | Wu | G01S 13/89 |
| 2005/0232459 | A1* | 10/2005 | Rowe | G06V 20/52 |
| | | | | 250/221 |
| 2007/0263907 | A1* | 11/2007 | McMakin | G06V 40/25 |
| | | | | 382/107 |
| 2008/0100510 | A1* | 5/2008 | Bonthron | G01S 13/89 |
| | | | | 342/373 |

(Continued)

FOREIGN PATENT DOCUMENTS

WO 2019234852 A1 12/2019

OTHER PUBLICATIONS

Zhuravlev, et al., "ISAR for concealed objects imaging", SPIE/IS&T Electronic Imaging (vol. 9401), 2015, 16 pages. DOI: 10.1117/12.2081761.

*Primary Examiner* — Marcus E Windrich
(74) *Attorney, Agent, or Firm* — Holtz, Holtz & Volek PC

(57) ABSTRACT

According to one embodiment, a system includes first to fourth transmission antennas, a plurality of reception antennas, and a processor. The processor is configured to acquire a first signal of radio waves which are transmitted by the first and third transmission antennas in a case where the measurement target is at a first position, acquire a second signal of radio waves which are transmitted by the second and fourth transmission antennas in a case where the measurement target is at a second position, and generate information of the measurement target by using the first and second signals. A first interval between the first and third transmission antennas and a second interval between the second and fourth transmission antennas are the same.

18 Claims, 9 Drawing Sheets

(56) References Cited

U.S. PATENT DOCUMENTS

| | | | |
|---|---|---|---|
| 2011/0241934 A1* | 10/2011 | Sarkis | G03H 5/00 |
| | | | 342/191 |
| 2014/0086387 A1* | 3/2014 | Aoi | H05G 1/32 |
| | | | 378/57 |
| 2014/0091965 A1* | 4/2014 | Sheen | G01S 13/90 |
| | | | 342/25 A |
| 2015/0048964 A1* | 2/2015 | Chen | G01S 13/426 |
| | | | 342/22 |
| 2018/0088224 A1* | 3/2018 | Kishigami | G01S 13/46 |
| 2018/0173161 A1* | 6/2018 | Chen | G01V 8/005 |
| 2021/0364614 A1* | 11/2021 | Loesch | G01S 7/40 |

* cited by examiner

SYSTEM FOR OBJECT DETECTION

CROSS-REFERENCE TO RELATED APPLICATIONS

This application is based upon and claims the benefit of priority from Japanese Patent Application No. 2020-167005, filed Oct. 1, 2020, the entire contents of which are incorporated herein by reference.

FIELD

Embodiments described herein relate generally to a system.

BACKGROUND

In recent years, for example, a system that performs security inspection using radio waves such as millimeter waves has been developed. Such a system includes an antenna array including a plurality of antenna elements, and a radio wave radiated from the antenna array toward a measurement target such as a person is reflected by the measurement target and received by the antenna array. The above-described system can obtain (for example, generate an image or the like) the information of the measurement target from the signal of the radio wave received by the antenna array in this manner.

Here, a system using a technology called inverse synthetic aperture radar (ISAR) is known. According to this ISAR, cost reduction and miniaturization of the system can be realized by reducing the number of antenna elements. Further, since the system using the ISAR is configured to obtain the information of the measurement target using the movement (for example, the walking of a person) of the measurement target, the security inspection can be completed only by the measurement target passing in front of a panel including the antenna array, for example.

However, in the system using the ISAR, the radio wave radiated toward the moving measurement target is received, and thus, it is difficult to obtain highly accurate information.

DETAILED DESCRIPTION

In general, according to one embodiment, a system includes first to fourth transmission antennas, a plurality of reception antennas, and a processor. The processor is configured to acquire a first signal of radio waves which are transmitted by the first transmission antenna and the third transmission antenna, reflected by a measurement target, and received by the reception antennas in a case where the measurement target is at a first position, acquire a second signal of radio waves which are transmitted by the second transmission antenna and the fourth transmission antenna, reflected by the measurement target, and received by the reception antennas in a case where the measurement target is at a second position different from the first position, and generate information of the measurement target by using the first signal and the second signal. A first interval between the first transmission antenna and the third transmission antenna and a second interval between the second transmission antenna and the fourth transmission antenna are the same.

Various embodiments will be described hereinafter with reference to the accompanying drawings.

First Embodiment

Figure 1:
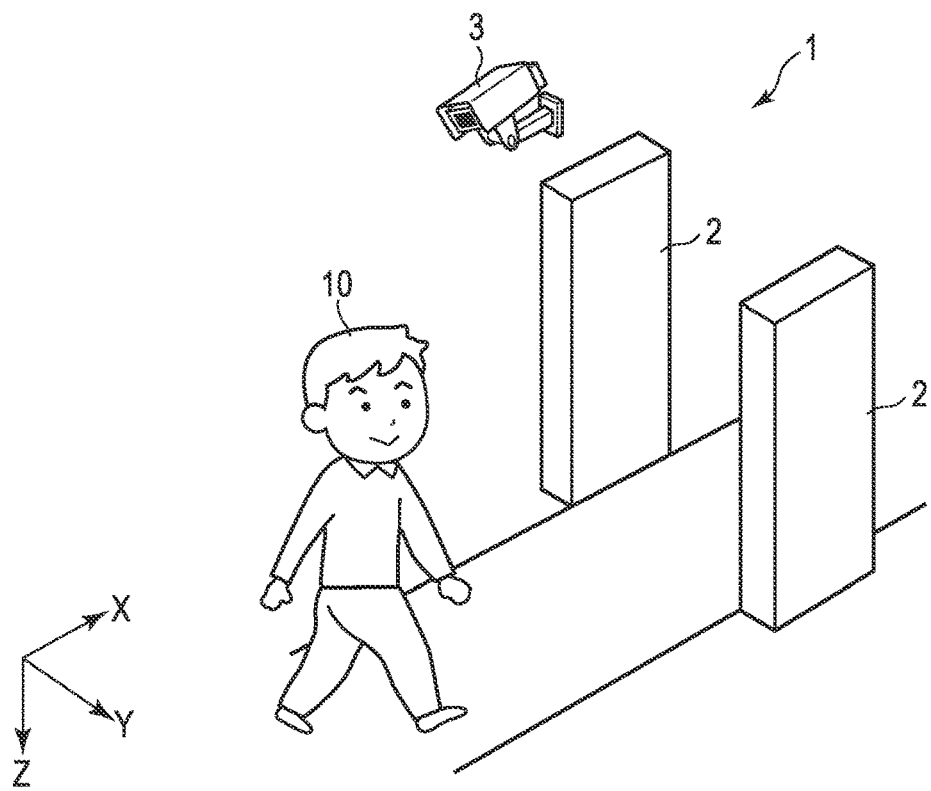
FIG. 1 is a diagram for explaining a usage mode of a system according to a first embodiment.

First, a usage mode of a system according to a first embodiment will be described with reference to FIG. 1. A system 1 according to this embodiment includes, for example, a panel 2, and is used as an imaging system (walkthrough imaging system) for performing a security inspection on a person (measurement target) 10 passing in front of the panel 2. The system 1 is used in, for example, public facilities such as airports and stations, but may be used in other places. Incidentally, FIG. 1 illustrates an example in which the system 1 includes two panels 2, but the number of the panels 2 may be one or more.

Although details will be described later, the panel 2 included in the system 1 according to this embodiment operates as a radar, and an antenna array (not illustrated) including a plurality of antenna elements is installed in the panel 2. Accordingly, the system 1 according to this embodiment acquires information of the person 10 by using a signal of a radio wave which is transmitted from the antenna array, reflected by the person 10 passing in front of the panel 2, and received by the antenna array.

Incidentally, in this embodiment, the antenna (element) includes not only an antenna itself but also a concept of an antenna module. Further, the information of the person 10 acquired by the system 1 includes an image including the person 10.

Here, in this embodiment, the person (walker) 10 is assumed as a measurement target (inspection target), but in this embodiment, an example of the radio wave transmitted from the antenna array is a millimeter wave (EHF: Extra High Frequency), and the millimeter wave has a characteristic of easily transmitting a non-metallic substance such as clothes. In this case, by acquiring the image including the person 10 passing (moving) in front of the panel 2 in an X direction by using the system 1, it is possible to inspect an object (a dangerous article or the like hidden under clothing) possessed by the person 10.

Incidentally, in this embodiment, the measurement target may be other than the person 10, and for example, the system 1 may be used to inspect an object held inside a box-shaped housing or the like passing in front of the panel 2.

The system 1 according to this embodiment further includes a sensor (motion sensor) 3 for acquiring information (hereinafter, referred to as motion information of the person 10) regarding real-time operation of the person 10 passing in front of the panel 2. The sensor 3 includes, for example, a camera (image sensor), but may be another sensor as long as it can acquire the motion information of the person 10. Incidentally, the sensor 3 may be incorporated in the panel 2 or may be arranged outside the panel 2.

Figure 2:
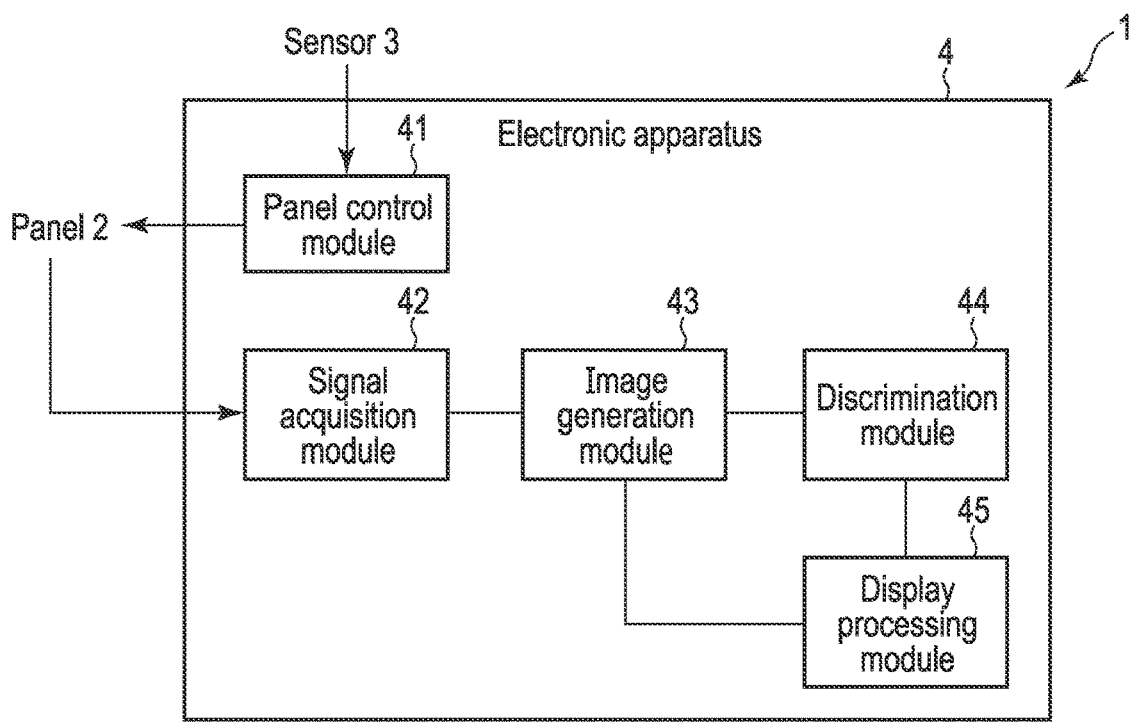
FIG. 2 is a block diagram illustrating an example of a functional configuration of the system.

FIG. 2 is a block diagram illustrating an example of a functional configuration of the system 1 according to this embodiment. As illustrated in FIG. 2, the system 1 includes an electronic apparatus 4 in addition to the panel 2 and the sensor 3 illustrated in FIG. 1. The electronic apparatus 4 is communicably connected to the panel 2 and the sensor 3, and operates as a server apparatus or the like for generating an image (measurement target information) of the person 10 described above. Incidentally, the electronic apparatus 4 may be incorporated in the panel 2, for example. Here, the functional configuration of the electronic apparatus 4 will be mainly described.

The electronic apparatus 4 includes a panel control module 41, a signal reception module 42, an image generation module 43, a discrimination module 44, and a display processing module 45.

Here, assuming that the sensor 3 is a camera (image sensor), the panel control module 41 receives an image, which includes the person 10, captured by the camera from the sensor 3 as sensor data. The panel control module 41 acquires (estimates) motion information of the person 10 based on the acquired sensor data. Incidentally, the motion information of the person 10 includes, for example, a position of the person 10. In this embodiment, the position of the person 10 may be a position of a specific object or the like (target object) regarding the person 10 or may be a position of an area to be measured in the target object, or the like.

The panel control module 41 controls the panel 2 based on the acquired motion information of the person 10. Specifically, the panel control module 41 controls the operation of the antenna array installed on the panel 2.

In this case, the antenna array installed on the panel 2 transmits (radiates) a radio wave (for example, a millimeter wave) to the person 10 passing in front of the panel 2 based on the control of the panel control module 41. The radio wave transmitted by the antenna array is reflected by the person 10 and received by the antenna array. The radio wave (reflected wave) received by the antenna array is converted into an electrical signal (hereinafter, referred to as a reflected wave signal). Accordingly, the panel 2 can acquire the reflected wave signal. The reflected wave signal acquired in the panel 2 in this manner is transmitted from the panel 2 to the electronic apparatus 4.

The signal reception module 42 receives the reflected wave signal (the signal of the radio wave reflected by person 10) transmitted from panel 2.

The image generation module 43 generates the image of the person 10 based on the reflected wave signal received by the signal reception module 42. Incidentally, in a case where a plurality of antenna elements configuring the antenna array are installed side by side in a Z direction illustrated in FIG. 1, a signal (that is, the reflected wave signal received by the signal reception module 42) of a radio wave which is radiated from the antenna element in a Y direction corresponds to a signal capable of generating a two-dimensional image in a Y-Z plane extending in a radiation direction of the radio wave.

Here, in this embodiment, the panel control module 41 controls the panel 2 (antenna array) to transmit a radio wave a plurality of times (for example, periodically) while the person 10 passes in front of the panel 2.

According to this, the signal reception module 42 can receive the reflected wave signal a plurality of times for each radio wave transmitted from the antenna array, and, for example, the image generation module 43 can generate (reconfigure) a three-dimensional image of the person 10 by executing a synthetic aperture process on the reflected wave signal received a plurality of times in this manner.

The discrimination module 44 discriminates the type of the object possessed by the person 10 based on the image (hereinafter, referred to as an inspection image) of the person 10 generated by the image generation module 43.

The display processing module 45 displays at least one of the inspection image generated by the image generation module 43 and the determination result by the discrimination module 44.

Figure 3:
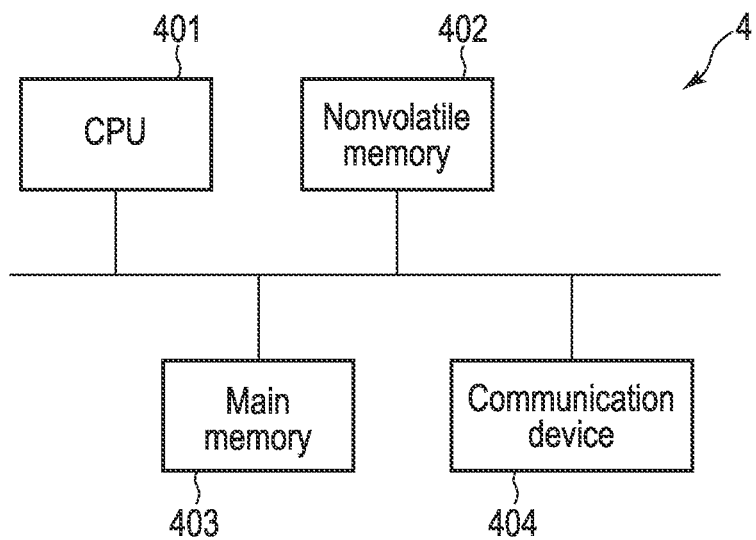
FIG. 3 is a diagram illustrating an example of a hardware configuration of an electronic apparatus.

FIG. 3 illustrates an example of a hardware configuration of the electronic apparatus 4 illustrated in FIG. 2. As illustrated in FIG. 3, the electronic apparatus 4 includes a CPU 401, a nonvolatile memory 402, a main memory 403, a communication device 404, and the like.

The CPU 401 is a hardware processor which controls operations of various components in the electronic apparatus 4. The CPU 401 executes various programs loaded from the nonvolatile memory 402 as a storage device to the main memory 403. The program executed by the CPU 401 includes an operating system (OS), a program (Hereinafter, referred to as an inspection program) for performing the above-described security inspection, and the like.

Incidentally, it is assumed that a part or all of the panel control module 41, the signal reception module 42, the image generation module 43, the discrimination module 44, and the display processing module 45 illustrated in FIG. 2 are realized by the CPU 401 (that is, the computer of the electronic apparatus 4) executing the above-described inspection program, that is, software. The inspection program may be stored in a computer-readable storage medium and distributed, or may be downloaded to the electronic apparatus 4 through a network.

Here, the description is given assuming that a part or all of the panel control module 41, the signal reception module 42, the image generation module 43, the discrimination module 44, and the display processing module 45 are realized by software. However, a part or all of these modules 41 to 45 may be realized by hardware such as an integrated circuit (IC), or may be realized as a combination configuration of software and hardware.

The communication device 404 is, for example, a device configured to execute wired or wireless communication. The electronic apparatus 4 is communicably connected to the sensor 3 and the panel 2 by the communication device 404.

Here, the description is given assuming that the electronic apparatus 4 includes the CPU 401, the nonvolatile memory 402, the main memory 403, and the communication device 404, but the electronic apparatus 4 may further include, for example, an input device (a keyboard, a mouse, or the like), a display device (a display or the like), and other devices.

Hereinafter, an operation principle of the system 1 according to this embodiment will be described. First, an inspection image generated in a system according to a comparative example of this embodiment will be conceptually described with reference to FIG. 4. As the comparative example of this embodiment, a system to which a technology called ISAR is applied is assumed.

Figure 4:
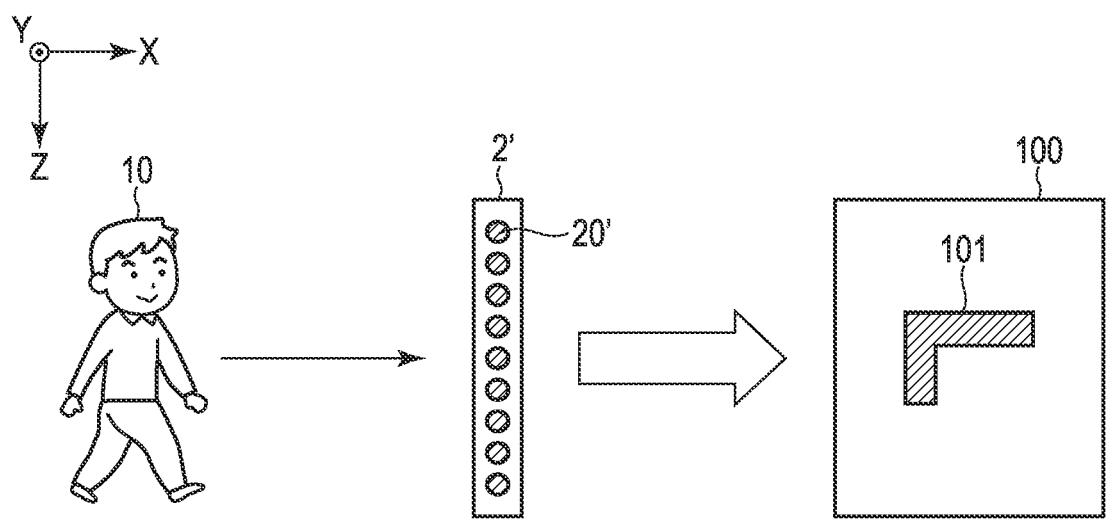
FIG. 4 is a diagram for conceptually explaining an inspection image generated in a system according to a comparative example of this embodiment.

As illustrated in FIG. 4, the system according to the comparative example of this embodiment includes, for example, a panel 2', and a plurality of transmission/reception antennas (transmission/reception antenna array) 20' arranged in, for example, the Z direction are installed (fixed) on the panel 2'. Although only one panel 2' is illustrated in FIG. 4 for convenience, the system according to the comparative example of this embodiment may include two panels 2' similarly to the panel illustrated in FIG. 1 described above.

Incidentally, the plurality of transmission/reception antennas 20' installed in the panel 2' can transmit radio waves to the person 10 passing in front of the panel 2' in the X direction and receive radio waves (that is, reflected waves) reflected by the person 10.

In the system according to the comparative example of this embodiment, for example, it is assumed that the person 10 passes in front of the panel 2' in the X direction during times t1 to t4.

In this case, each of the plurality of transmission/reception antennas 20' installed in the panel 2' transmits a radio wave at the time t1 to the person 10 passing in front of the panel 2', and receives a reflected wave from the person 10. In the panel 2, a reflected wave signal is acquired from the reflected wave received in this manner (that is, the reflected wave is converted into an electrical signal), and this reflected wave signal corresponds to a signal capable of generating a two-dimensional image of the person 10 in the Y-Z plane at the time t1.

Although the time t1 is described here, similar processing is repeated from the time t2 to the time t4. Accordingly, the inspection image 100 can be obtained by executing the synthetic aperture processing on the reflected wave signal acquired at each of the times t1 to t4. Incidentally, in FIG. 4, the inspection image 100 is illustrated as a two-dimensional image (an image in the Y-Z plane) of the person 10 as viewed from the X direction for convenience, but the inspection image 100 may be a three-dimensional image as described above.

According to such an inspection image 100, for example, it is possible to detect that the person 10 possesses a dangerous article 101. Incidentally, in FIG. 4, an object imitating the shape of a gun is illustrated as the dangerous article 101, but the dangerous article 101 may be another object.

Here, in order to generate an inspection image with high accuracy, it is preferable to arrange each of the plurality of transmission/reception antennas 20' so as not to be theoretically excessively far from each other. However, in a case where an interval between the transmission/reception antennas 20' is narrow, the radio waves (reflected waves) received by the transmission/reception antennas 20' may interfere with each other, affecting the accuracy of the inspection image generated based on the reflected wave signal. Therefore, in a general antenna array, the plurality of transmission/reception antennas 20' are arranged at intervals of substantially half a wavelength, for example.

Figure 5:
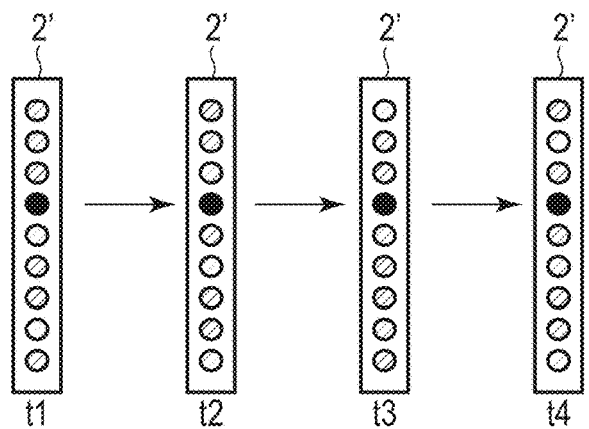
FIG. 5 is a diagram for conceptually explaining a position of a transmission/reception antenna which receives a reflected wave.

Incidentally, each of the reflected wave signals acquired at the times t1 to t4 corresponds to a signal capable of generating a two-dimensional image in the Y-Z plane. However, when the position of (the dangerous article 101 possessed by) the person 10 passing in front of the panel 2' does not change, the reflected waves from the dangerous article 101 are received by the same transmission/reception antenna 20' at the times t1 to t4 as illustrated in FIG. 5. In this case, the position of the dangerous article 101 (that is, the dangerous article 101 as viewed from the X direction) on the two-dimensional image in the Y-Z plane generated based on the reflected wave signal acquired at each of the times t1 to t4 is not deviated, and the inspection image 100 with high accuracy as illustrated in FIG. 4 can be generated when the synthetic aperture processing is executed.

Figure 6:
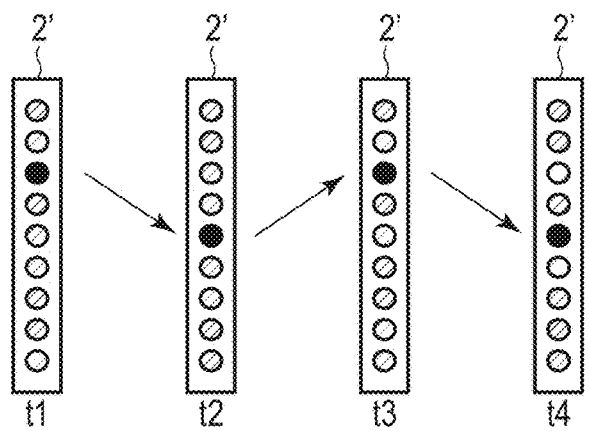
FIG. 6 is a diagram for conceptually explaining a position of the transmission/reception antenna which receives a reflected wave.
Figure 7:
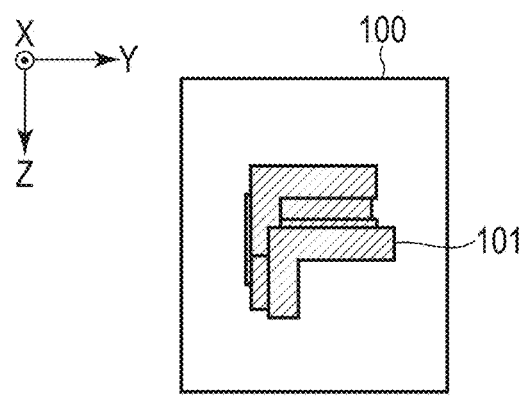
FIG. 7 is a diagram illustrating an outline of the inspection image generated in the system according to the comparative example of this embodiment.

However, in a case where the person 10 actually passes (walks) in front of the panel 2', a change in the position of the person 10 in a lateral direction (Y direction) is small and can be ignored, but the position of the person 10 in a height direction is often relatively largely changed (up and down) according to the movement of the legs of the person 10. In this case, for example, as illustrated in FIG. 6, the reflected waves from the dangerous article 101 possessed by the person 10 are received by the transmission/reception antennas 20' at different positions at the time t1 to t4. According to this, the position of the dangerous article 101 (that is, the dangerous article 101 as viewed from the X direction) on the two-dimensional image in the Y-Z plane generated based on the reflected wave signal acquired at each of the times t1 to t4 is deviated at least in the height direction (Z direction) of the person 10 as illustrated in FIG. 7, and the inspection image 100 with high accuracy cannot be generated in a case where the synthetic aperture processing is executed.

As described above, the plurality of transmission/reception antennas 20' installed in the panel 2' included in the system according to the comparative example of this embodiment cannot cope with the change in the position in the height direction of the person 10 passing in front of the panel 2', and the accuracy of the inspection image of the person 10 (dangerous article 101) may be low.

In this regard, this embodiment has a configuration capable of obtaining an inspection image with high accuracy without being affected by a change in the position of the person 10 passing in front of the panel 2 as described above.

Figure 8:
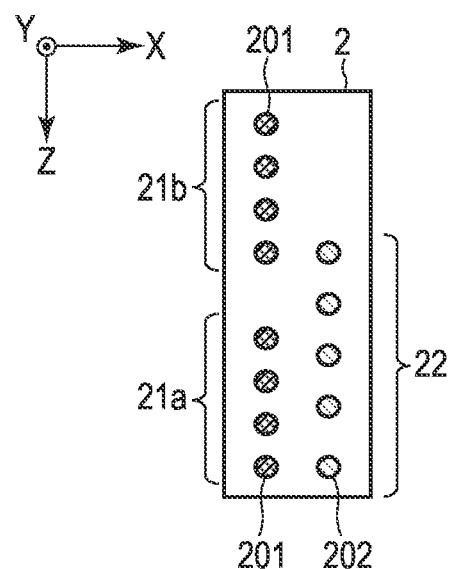
FIG. 8 is a diagram illustrating an example of a configuration of a panel included in the system according to this embodiment.

FIG. 8 illustrates an example of a configuration of the panel 2 included in the system 1 according to this embodiment. As illustrated in FIG. 8, a first transmission antenna array 21*a*, a second transmission antenna array 21*b*, and a reception antenna array 22 are installed in the panel 2.

Each of the first transmission antenna array 21*a* and the second transmission antenna array 21*b* includes a plurality of (for example, four) transmission antennas 201 capable of transmitting radio waves. The four transmission antennas 201 configuring the first transmission antenna array 21*a* and the four transmission antennas 201 configuring the second transmission antenna array 21*b* are arranged (arrayed) to be positioned on the same straight line extending in the Z direction. Further, in such a panel 2, the plurality of transmission antennas 201 are arranged such that each interval (distance) between the four transmission antennas 201 configuring the first transmission antenna array 21*a* and each interval (distance) between the four transmission antennas 201 configuring the second transmission antenna array 21*b* are the same.

The reception antenna array 22 includes a plurality of (for example, five) reception antennas 202 capable of receiving radio waves. In the reception antenna array 22, the five reception antennas 202 are arranged (arrayed) to be positioned on the same straight line, which is different from the straight line on which the plurality of transmission antennas 201 are arranged, extending in the Z direction. Further, in such a panel 2, the reception antennas 202 are arranged at equal intervals.

According to such a panel 2, it is possible to acquire a reflected wave signal (that is, the reflected wave signal based on the radio waves transmitted from the plurality of transmission antennas 201) by transmitting radio waves from the plurality of transmission antennas 201 and receiving the radio waves reflected by the person 10 by the plurality of reception antennas 202.

Here, the reflected wave signal acquired in the panel 2 illustrated in FIG. 8 will be specifically described with reference to FIG. 9.

Here, as described with reference to FIG. 8, it is assumed that the first transmission antenna array 21*a* includes the four transmission antennas 201, and a radio wave is transmitted from the transmission antenna 201 (hereinafter, referred to as a first transmission antenna 201 of the first transmission antenna array 21*a*) positioned at the bottom in the height direction of the person 10 among the four transmission antennas 201 configuring the first transmission antenna array 21*a*.

In this case, the radio wave transmitted from the first transmission antenna 201 of the first transmission antenna array 21*a* is reflected by the person 10 and received by each of the plurality of reception antennas 202 configuring the reception antenna array 22.

Specifically, in a case where a radio wave is transmitted from the first transmission antenna 201 of the first transmission antenna array 21*a*, the reception antenna 202 (hereinafter, referred to as a first reception antenna 202) positioned at the bottom in the height direction of the person 10 among the plurality of reception antennas 202 configuring the reception antenna array 22 receives the radio wave reflected by the person 10 at a position (height) 231 corresponding to the midpoint between the first transmission antenna 201 and the first reception antenna 202.

Similarly, in a case where a radio wave is transmitted from the first transmission antenna 201 of the first transmission antenna array 21*a*, the reception antenna 202 (hereinafter, referred to as a second reception antenna 202) positioned second from the bottom in the height direction of the person 10 among the plurality of reception antennas 202 configuring the reception antenna array 22 receives the radio wave reflected by the person 10 at a position (height) 232 corresponding to the midpoint between the first transmission antenna 201 and the second reception antenna 202.

In a case where a radio wave is transmitted from the first transmission antenna 201 of the first transmission antenna array 21*a*, the reception antenna 202 (hereinafter, referred to as a third reception antenna 202) positioned third from the bottom in the height direction of the person 10 among the plurality of reception antennas 202 configuring the reception antenna array 22 receives the radio wave reflected by the person 10 at a position (height) 233 corresponding to the midpoint between the first transmission antenna 201 and the third reception antenna 202.

In a case where a radio wave is transmitted from the first transmission antenna 201 of the first transmission antenna array 21*a*, the reception antenna 202 (hereinafter, referred to as a fourth reception antenna 202) positioned fourth from the bottom in the height direction of the person 10 among the plurality of reception antennas 202 configuring the reception antenna array 22 receives the radio wave reflected by the person 10 at a position (height) 234 corresponding to the midpoint between the first transmission antenna 201 and the fourth reception antenna 202.

Similarly, in a case where a radio wave is transmitted from the first transmission antenna 201 of the first transmission antenna array 21*a*, the reception antenna 202 (hereinafter, referred to as a fifth reception antenna 202) positioned at the fifth position (that is, the uppermost portion) from the bottom in the height direction of the person 10 among the plurality of reception antennas 202 configuring the reception antenna array 22 receives the radio wave reflected by the person 10 at a position (height) 235 corresponding to the midpoint between the first transmission antenna 201 and the fifth reception antenna 202.

Figure 9:
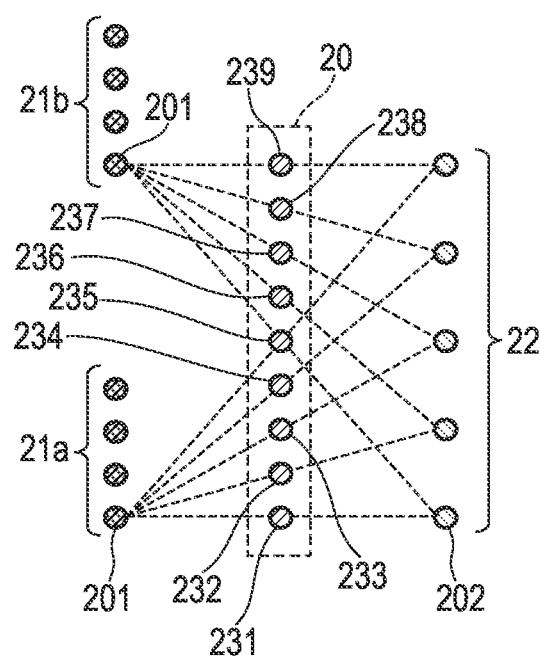
FIG. 9 is a diagram for specifically explaining a reflected wave signal acquired in the panel.

That is, in a case where a radio wave is transmitted from the first transmission antenna 201 of the first transmission antenna array 21*a*, as illustrated in FIG. 9, it is possible to acquire a reflected wave signal equivalent to the signal which can be acquired by installing the transmission/reception antenna 20' at each of the positions 231 to 235 of the panel 2' in the comparative example of this embodiment described above. In other words, a pair of the first transmission antenna 201 of the first transmission antenna array 21*a* and each of the reception antennas 202 configuring the reception antenna array 22 acts similarly to the transmission/reception antenna 20' installed at each of the positions 231 to 235.

Here, a case has been described in which a radio wave is transmitted from the first transmission antenna 201 of the first transmission antenna array 21*a*. However, for example, the same applies to a case where the second transmission antenna array 21*b* includes the four transmission antennas 201, and a radio wave is transmitted from the transmission antenna 201 (hereinafter, referred to as a first transmission antenna 201 of the second transmission antenna array 21*b*) positioned at the bottom in the height direction of the person 10 among the four transmission antennas 201 configuring the second transmission antenna array 21*b*.

That is, in a case where a radio wave is transmitted from the first transmission antenna 201 of the second transmission antenna array 21*b*, as illustrated in FIG. 9, it is possible to acquire a reflected wave signal equivalent to the signal which can be acquired by installing the transmission/reception antenna 20' at each of positions 235 to 239 of the panel 2' in the comparative example of this embodiment described above. In other words, a pair of the first transmission antenna 201 of the second transmission antenna array 21*b* and each of the reception antennas 202 configuring the reception antenna array 22 acts similarly to the transmission/reception antenna 20' installed at each of the positions 235 to 239.

According to the panel 2 on which the first transmission antenna array 21*a*, the second transmission antenna array 21*b*, and the reception antenna array 22 are installed, a radio wave is transmitted from the first transmission antenna 201 of each of the first transmission antenna array 21*a* and the second transmission antenna array 21*b*, and the reflected wave from the person 10 is received by the reception antenna array 22 (the plurality of reception antennas 202), whereby a virtual antenna array 20 corresponding to the plurality of transmission/reception antennas 20' installed in the panel 2' in the comparative example of this embodiment can be realized.

Incidentally, as a transmission/reception method of the antenna array, there are a monostatic method in which transmission and reception are performed by the same antenna element as in the comparative example of this embodiment, and a multi-static method (bistatic method) in which transmission and reception are performed by different antenna elements as in this embodiment. However, this embodiment uses a monostatic method virtually realized by applying the multi-static method.

In FIG. 9, a case has been described in which radio waves are transmitted from the first transmission antenna 201 of the first transmission antenna array 21a and the first transmission antenna 201 of the second transmission antenna array 21b. However, the virtual antenna array 20 can be similarly realized even in a case where a radio wave is transmitted from another transmission antenna 201.

Figure 10:
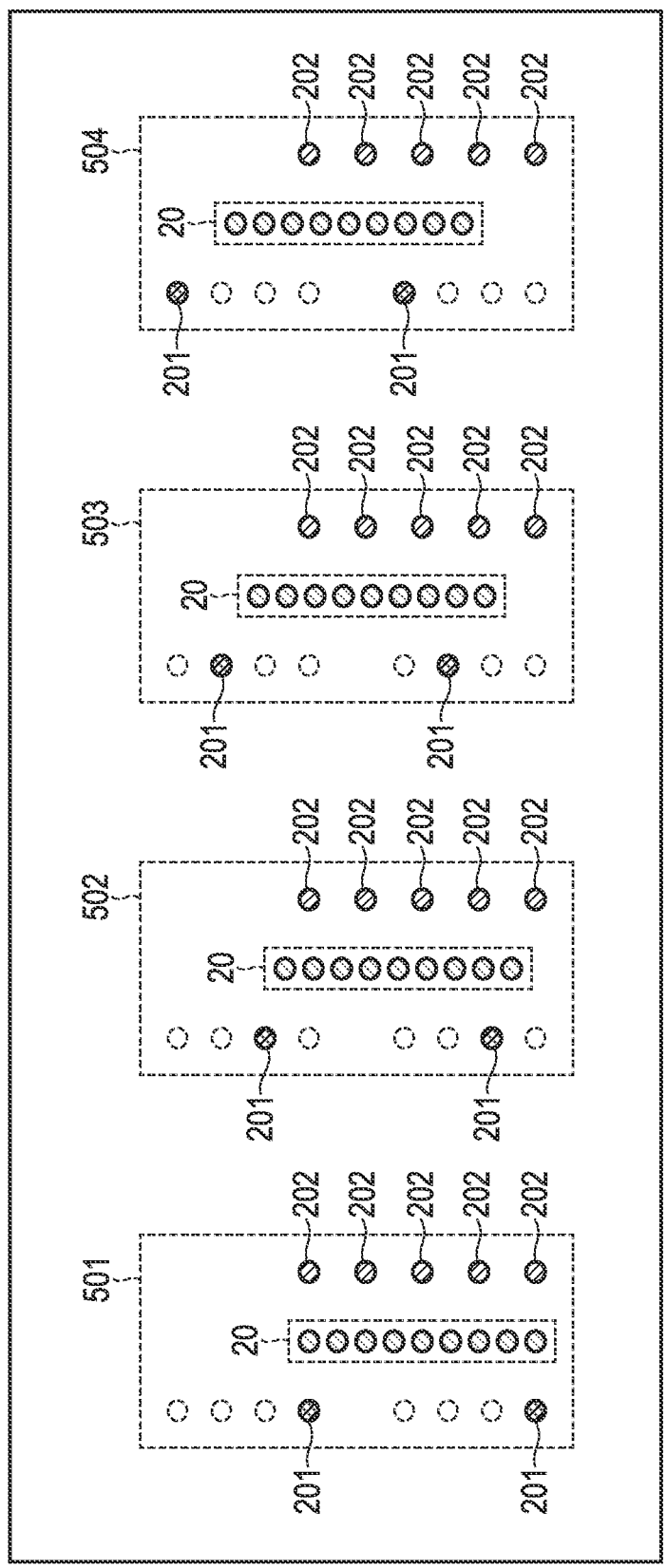
FIG. 10 is a diagram conceptually illustrating a virtual antenna array realized according to a transmission antenna which transmits a radio wave.

FIG. 10 conceptually illustrates the virtual antenna array 20 realized according to the transmission antenna 201 which transmits a radio wave.

In a frame 501 illustrated in FIG. 10, the virtual antenna array 20 is illustrated which is realized in a case where radio waves are transmitted from the first transmission antenna 201 of the first transmission antenna array 21a and the first transmission antenna 201 of the second transmission antenna array 21b, and the reflected waves from the person 10 are received by the reception antenna array 22 as described in FIG. 9.

In a frame 502 illustrated in FIG. 10, the virtual antenna array 20 is illustrated which is realized in a case where radio waves are transmitted from a second transmission antenna 201 of the first transmission antenna array 21a and a second transmission antenna 201 of the second transmission antenna array 21b, and the reflected waves from the person 10 are received by the reception antenna array 22. Incidentally, the second transmission antenna 201 of the first transmission antenna array 21a is the transmission antenna 201 positioned second from the bottom in the height direction of the person 10 among the four transmission antennas 201 configuring the first transmission antenna array 21a. Further, the second transmission antenna 201 of the second transmission antenna array 21b is the transmission antenna 201 positioned second from the bottom in the height direction of the person 10 among the four transmission antennas 201 configuring the second transmission antenna array 21b.

In a frame 503 illustrated in FIG. 10, the virtual antenna array 20 is illustrated which is realized in a case where radio waves are transmitted from a third transmission antenna 201 of the first transmission antenna array 21a and a third transmission antenna 201 of the second transmission antenna array 21b, and the reflected waves from the person 10 are received by the reception antenna array 22. Incidentally, the third transmission antenna 201 of the first transmission antenna array 21a is the transmission antenna 201 positioned third from the bottom in the height direction of the person 10 among the four transmission antennas 201 configuring the first transmission antenna array 21a. Further, the third transmission antenna 201 of the second transmission antenna array 21b is the transmission antenna 201 positioned third from the bottom in the height direction of the person 10 among the four transmission antennas 201 configuring the second transmission antenna array 21b.

In a frame 504 illustrated in FIG. 10, the virtual antenna array 20 is illustrated which is realized in a case where radio waves are transmitted from a fourth transmission antenna 201 of the first transmission antenna array 21a and a fourth transmission antenna 201 of the second transmission antenna array 21b, and the reflected waves from the person 10 are received by the reception antenna array 22. Incidentally, the fourth transmission antenna 201 of the first transmission antenna array 21a is the transmission antenna 201 positioned at the fourth position (that is, the uppermost portion) from the bottom in the height direction of the person 10 among the four transmission antennas 201 configuring the first transmission antenna array 21a. Further, the fourth transmission antenna 201 of the second transmission antenna array 21b is the transmission antenna 201 positioned at the fourth position (that is, the uppermost portion) from the bottom in the height direction of the person 10 among the four transmission antennas 201 configuring the second transmission antenna array 21b.

FIG. 10 illustrates that the position of the virtual antenna array 20 realized according to the transmission antenna 201 can be made higher in the order of the first transmission antenna 201, the second transmission antenna 201, the third transmission antenna 201, and the fourth transmission antenna 201.

That is, in this embodiment, the position (height) of the virtual antenna array 20 can be changed by switching the transmission antenna 201 which transmits a radio wave among the plurality of transmission antennas 201 configuring each of the first transmission antenna array 21a and the second transmission antenna array 21b.

In the comparative example of this embodiment described above, the plurality of transmission/reception antennas 20' are fixed, and thus it is not possible to cope with the change in the position in the height direction of the person 10 passing in front of the panel 2'. However, in this embodiment, it is possible to cope with the change in the position in the height direction of the person 10 passing in front of the panel 2 by changing the position of the virtual antenna array 20 as described above.

Figure 11:
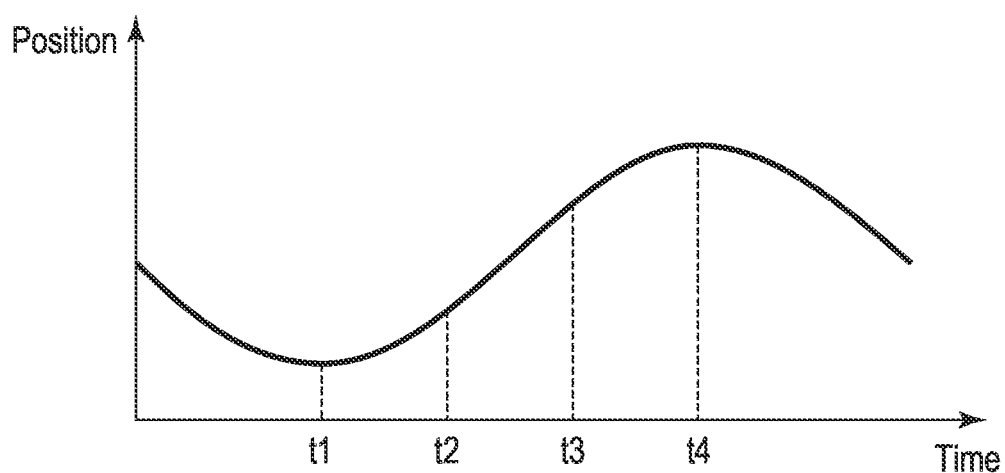
FIG. 11 is a diagram illustrating an example of a change in a position of a person passing in front of the panel.

Specifically, for example, a case is assumed in which the position (height) of the person 10 passing in front of the panel 2 changes as illustrated in FIG. 11 in the times t1 to t4 as described above. In this case, for example, the position of the person 10 is low in a predetermined period including the time t1, and thus, in the period, a radio wave is transmitted from the first transmission antenna 201 of each of the first transmission antenna array 21a and the second transmission antenna array 21b. Next, the position of the person 10 is higher than that at the time t1 in a predetermined period including the time t2, and thus, in the period, a radio wave is transmitted from the second transmission antennas 201 of each of the first transmission antenna array 21a and the second transmission antenna array 21b.

That is, in this embodiment, for example, in a case where the position of the person 10 changes from the position at the time t1 to the position at the time t2 (that is, upward), the transmission antenna 201 which transmits a radio wave is switched from the first transmission antenna 201 to the second transmission antenna 201 installed at the position spaced a predetermined distance upward from the position of the first transmission antenna 201.

The position of the person 10 is higher than that at the time t2 in a predetermined period including the time t3, and thus, in the period, a radio wave is transmitted from the third transmission antennas 201 of each of the first transmission antenna array 21a and the second transmission antenna array 21b. Further, the position of the person 10 is higher than that at the time t3 in a predetermined period including the time t4, and thus, in the period, a radio wave is transmitted from the fourth transmission antennas 201 of each of the first transmission antenna array 21a and the second transmission antenna array 21b.

Accordingly, even in a case where the position (height) of the person 10 passing in front of the panel 2 changes, at the times t1 to t4, the radio waves reflected by the dangerous article possessed by the person 10 can be received at the same position in the virtual antenna array 20 to acquire the reflected wave signals.

Therefore, in this embodiment, as described in the comparative example of this embodiment, it is possible to prevent the accuracy of the inspection image from deteriorating due to the positional deviation of the dangerous article in the height direction at the times t1 to t4.

Here, an example is described in which radio waves are transmitted in the order of the first to fourth transmission antennas 201 in the first transmission antenna array 21a and the second transmission antenna array 21b. However, the order of the transmission antennas 201 which transmit the radio waves is changed according to the position of the person 10. Incidentally, the above-described position (height) of the person 10 can be acquired by using the sensor 3 included in the system 1.

In the comparative example of this embodiment, the description is given assuming that the plurality of transmission/reception antennas 20' are arranged at intervals of, for example, substantially half wavelengths. However, the positions where (the plurality of transmission antennas 201 configuring) the first transmission antenna array 21a, (the plurality of transmission antennas 201 configuring) the second transmission antenna array 21b, and (the plurality of reception antennas 202 configuring) the reception antenna array 22 are installed in this embodiment are determined such that each interval of the plurality of transmission/reception antennas 20' virtually realized as the virtual antenna array 20 described above is substantially a half wavelength. In this case, according to this embodiment, each of the plurality of reception antennas 202 can be arranged such that the interval therebetween is, for example, about twice the half wavelength.

FIG. 8 illustrates an installation example of the first transmission antenna array 21a, the second transmission antenna array 21b, and the reception antenna array 22 in this embodiment. However, the first transmission antenna array 21a, the second transmission antenna array 21b, and the reception antenna array 22 in this embodiment may be installed at other positions as long as the design requirements of the panel 2 are satisfied.

Specifically, the first transmission antenna array 21a and the second transmission antenna array 21b may be installed on a straight line on which the reception antenna array 22 illustrated in FIG. 8 is installed, and the reception antenna array 22 may be installed on a straight line on which the first transmission antenna array 21a and the second transmission antenna array 21b illustrated in FIG. 8 are installed.

The first transmission antenna array 21a and the second transmission antenna array 21b (the plurality of transmission antennas 201) and the reception antenna array 22 (the plurality of reception antennas 202) may be installed on the same straight line.

Some of the plurality of transmission antennas 201 and some of the plurality of reception antennas 202 may be installed at the same position (that is, configured as transmission/reception antennas).

In FIG. 8, the description is given assuming that each of the first transmission antenna array 21a and the second transmission antenna array 21b includes four transmission antennas 201. However, each of the first transmission antenna array 21a and the second transmission antenna array 21b may include at least two transmission antennas 201. Further, in FIG. 8, the description is given assuming that the reception antenna array 22 includes five reception antennas 202. However, the reception antenna array 22 may include one reception antenna 202 or may include a plurality of reception antennas 202.

In a case where the system 1 includes two panels 2 as illustrated in FIG. 1, the transmission antenna array and the reception antenna array may be similarly installed in the two panels 2, but the transmission antenna array and the reception antenna array may be installed at different positions in the two panels 2.

Next, an example of a processing procedure of the electronic apparatus 4 included in the system 1 according to this embodiment will be described with reference to a flowchart of FIG. 12.

First, in a case where a security inspection is performed on the person (measurement target) 10, the panel control module 41 receives sensor data from the sensor 3 (step S1). Incidentally, as described above, the sensor 3 is, for example, a camera, and the sensor data received from the sensor 3 includes an image captured by the camera. Further, in step S1, a plurality of images captured in a predetermined period may be received as the sensor data.

Next, the panel control module 41 determines whether or not the person 10 is present in the vicinity of the panel 2 (that is, the person 10 passes in front of the panel 2) based on the sensor data received in step S1 (step S2). In step 32, in a case where the person 10 is included in the image received as the sensor data, it is determined that the person 10 is present in the vicinity of the panel 2. On the other hand, in a case where the person 10 is not included in the image received as the sensor data, it is determined that the person 10 is not present in the vicinity of the panel 2.

Figure 12:
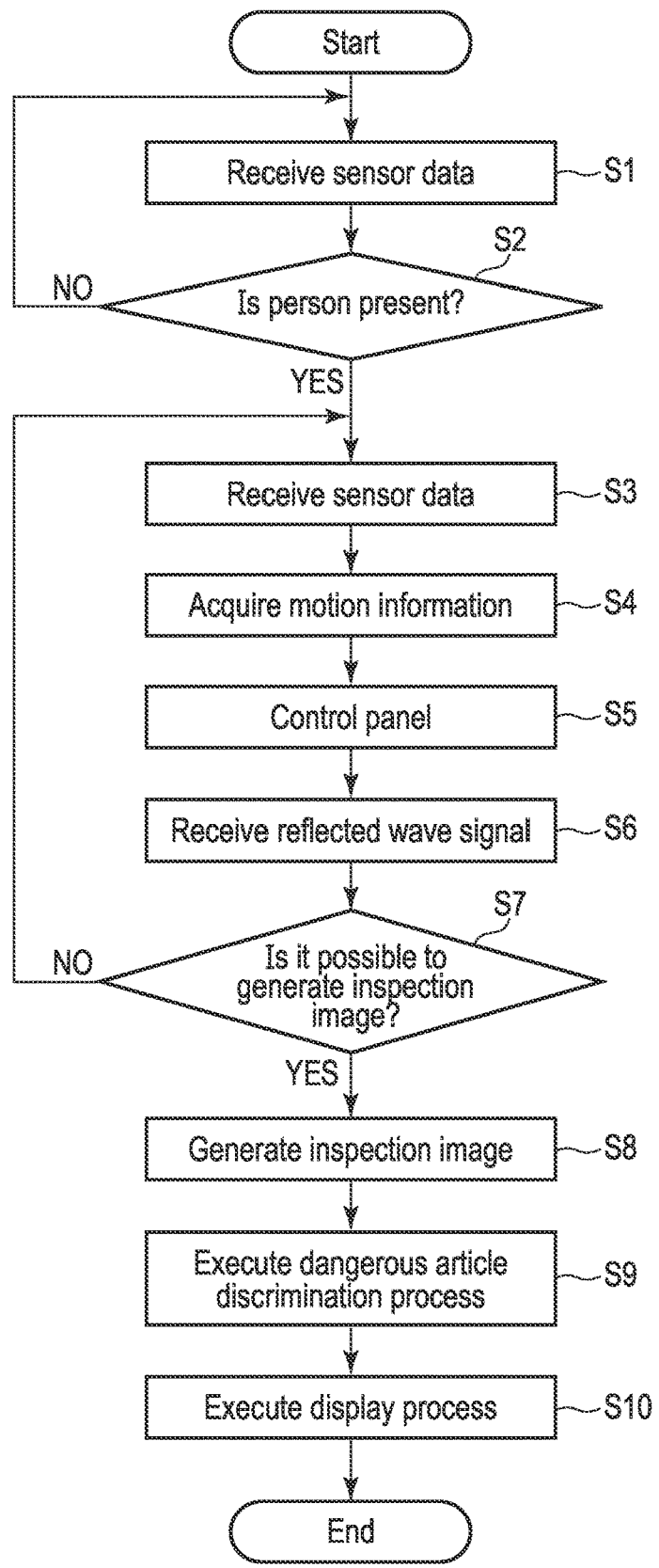
FIG. 12 is a flowchart illustrating an example of a processing procedure of an electronic apparatus provided in the system.

Incidentally, in the example illustrated in FIG. 12, the description is given assuming that the processing of step S2 is executed based on the sensor data received from the sensor 3 in step S1. However, the processing of step S2 may be executed based on other than the sensor data as long as the timing of performing the security inspection on the person 10 can be discriminated.

In a case where it is determined that the person 10 is not present in the vicinity of the panel 2 (NO in step S2), the procedure returns to step S1, and the processing is repeated.

On the other hand, in a case where it is determined that the person 10 is present in the vicinity of the panel 2 (YES in step S2), the processing of step S3 corresponding to the processing of step S1 described above is executed.

The panel control module 41 acquires the motion information of the person 10 based on the sensor data received in step S3 (step S4). As described above, in a case where the sensor data is an image including the person 10, the panel control module 41 acquires the motion information including at least the position of the person 10 by executing an image analysis process on the sensor data.

Incidentally, the position of the person (measurement target) 10 described above refers to, for example, a position of a specific portion (such as the center of the body) of the person 10 in the height direction, but may be a position of a partial area (measurement area) of the person 10 that is stationary.

The motion information of the person 10 acquired in step S3 described above may include a distance, a speed, and the like, in which the person 10 moves, calculated based on the sensor data (for example, a plurality of images).

Here, the description is given assuming that the motion information of the person 10 is acquired based on the sensor data received in step S3. However, for example, the processing of step S3 may be omitted, and the motion information of the person 10 may be acquired based on the sensor data received in step S1.

Next, the panel control module 41 operates the panel 2 (radar), and controls the panel 2 based on the motion information (the position of the person 10) of the person 10 acquired in step S4 (step S5).

In step S5, the panel control module 41 determines the transmission antenna 201 (the transmission antenna 201 of each of the first transmission antenna array 21a and the second transmission antenna array 21b) corresponding to the position of the person 10 from among the plurality of transmission antennas 201 installed on the panel 2, and controls the panel 2 such that a radio wave is transmitted from the determined transmission antenna 201. In this case, a radio wave is not transmitted from the transmission antenna 201 other than the transmission antenna 201 determined by the panel control module 41. On the other hand, the reception antenna array 22 is controlled such that all of the plurality of reception antennas 202 configuring the reception antenna array 22 can receive radio waves.

Here, for example, a case is assumed in which the first transmission antenna 201 of the first transmission antenna array 21a and the first transmission antenna 201 of the second transmission antenna array 21b are determined as the transmission antenna 201 which transmits a radio wave. In this case, each of the plurality of reception antennas 202 configuring the reception antenna array 22 cannot simultaneously receive the radio wave (the radio wave reflected by the person 10) transmitted from the first transmission antenna 201 of the first transmission antenna array 21a and the radio wave (the radio wave reflected by the person 10) transmitted from the first transmission antenna 201 of the second transmission antenna array 21b. Therefore, the panel control module 41 controls the panel 2 to transmit a radio wave from the first transmission antenna 201 of the first transmission antenna array 21a and then transmit a radio wave from the first transmission antenna 201 of the second transmission antenna array 21b.

When the processing of step S5 is executed, the panel 2 transmits the signal (reflected wave signal) of the reflected wave from the person 10 received by each of the plurality of reception antennas 202 to the electronic apparatus 4. The reflected wave signal transmitted from panel 2 to the electronic apparatus 4 in this manner is received by the signal reception module 42 (step S6).

Next, the panel control module 41 determines whether or not the inspection image can be generated by executing the synthetic aperture process (step S7). In step S7, it is determined that the inspection image can be generated, for example, in a case where the reflected wave signal to the extent that the inspection image can be generated by executing the synthetic aperture process is received.

In a case where it is determined that the inspection image cannot be generated (NO in step S7), the procedure returns to step S3, and the processing is repeated. By repeating the processing in this manner, the reflected wave signal can be received from the panel 2 repeatedly (for example, at each of times t1 to t4) while the person 10 passes in front of the panel 2.

Here, the processing of step 37 described above may be executed based on the motion information of the person 10 acquired in step S4 described above.

Specifically, for example, in a case where the motion information of the person 10 includes a distance by which the person 10 moves, when the distance exceeds a predetermined value (that is, the person 10 has passed in front of the panel 2), it may be determined in step S7 that the inspection image can be generated. That is, in this embodiment, a radio wave can be transmitted from the transmission antenna 201 while the person 10 moves by the predetermined distance.

As described above, the control (the transmission of the radio wave from the transmission antenna 201 of each of the first transmission antenna array 21a and the second transmission antenna array 21b) of the panel 2 is repeatedly executed while the person 10 passes in front of the panel 2. However, the interval (that is, a period during which radio waves are transmitted from the first transmission antenna array 21a and the second transmission antenna array 21b) at which the panel 2 is controlled may be determined based on the motion information of the person 10. Specifically, for example, in a case where the motion information of the person 10 includes the speed at which the person 10 moves, the interval at which the panel 2 is controlled may be shortened when the speed of the person 10 is relatively high, and the interval at which the panel 2 is controlled may be lengthened when the speed is relatively low.

On the other hand, in a case where it is determined that the inspection image can be generated (YES in step S7), the image generation module 43 executes the synthetic aperture process based on the reflected wave signal received in repeatedly executed step S6, and generates the inspection image of (the object possessed by) the person 10 (step S8).

When the processing of step S8 is executed, the discrimination module 44 executes a processing (hereinafter, referred to as a dangerous article discrimination process) of discriminating the type of the object possessed by the person 10 based on the inspection image generated in step S8 (step S9). In this dangerous article discrimination process, for example, the type of the object possessed by the person 10 can be discriminated using the shape or the like (template) of a dangerous article such as a gun or a blade prepared in advance. However, other processing may be executed as long as the type of the object can be discriminated (that is, it is detected whether or not the person 10 possesses a dangerous article).

Next, the display processing module 45 displays the inspection image generated in step 28 and the determination result (that is, the detection result as to whether or not the person 10 possesses a dangerous article) in step S9 (step S10). The inspection image generated in step S8 and the determination result in step S9 may be displayed on a display device or the like provided in the electronic apparatus 4, or may be displayed on an external apparatus different from the electronic apparatus 4.

Incidentally, in a case where the inspector of the security inspection visually checks the inspection image to determine whether or not the person 10 possesses a dangerous article, only the inspection image is displayed in step S10, and the processing of step S9 may foe omitted. Further, the inspection image may be displayed as a two-dimensional image or may be displayed as a three-dimensional image. Further, in a case where the sensor 3 described above is a camera, the inspection image may be displayed to be superimposed on, for example, an image, which includes the person 10, captured by the camera.

In FIG. 12, the description is mainly given assuming that there is one panel 2 included in the system 1. However, in a case where the system 1 includes two panels 2, the processing in and after step S3 is executed for each panel 2 (that is, the inspection image is generated for each panel). Incidentally, in a case where the system 1 includes two panels 2, one inspection image may be generated based on the reflected wave signal transmitted from each of the panels 2.

Here, for convenience of description, assuming that the first transmission antenna array 21a includes two transmission antennas (first and second transmission antennas), and the second transmission antenna array 21b includes two transmission antennas (third and fourth transmission antennas) (that is, the system 1 includes the first to fourth transmission antennas), in this embodiment described above, in a case where the measurement target is at the first position (relatively low position), the first signal (reflected wave signal) of the radio wave transmitted by the first transmission antenna and the third transmission antenna, reflected by the measurement target, and received by the plurality of reception antennas is acquired. Further, in this embodiment, in a case where the measurement target is at the second position (relatively high position), the second signal (reflected wave signal) of the radio wave transmitted by the second transmission antenna and the fourth transmission antenna, reflected by the measurement target, and received by the plurality of reception antennas is acquired. Specifically, for example, in a case where the position of the measurement target is the first position in the first period, radio waves are transmitted from the first transmission antenna and the third transmission antenna in the first, period. On the other hand, for example, in a case where the position of the measurement target is the second position in the second period, radio waves are transmitted from the second transmission antenna and the fourth transmission antenna in the second period.

In this embodiment, the inspection image is generated as the information of the measurement target by using the first signal and the second signal acquired as described above.

The interval (first interval) between the first transmission antenna and the third transmission antenna and the interval (second interval) between the second transmission antenna and the fourth transmission antenna are the same.

Incidentally, for example, in a case where a direction from the first position to the second position is a first, direction (for example, upward), the second transmission antenna is installed at the position separated by a first distance in the first direction from the position of the first transmission antenna, and the fourth transmission antenna is installed at the position separated by the first distance in the first direction from the position of the third transmission antenna.

In this embodiment, with the above-described configuration, it is possible to generate an inspection image with high accuracy (obtain the information of the measurement target) based on the reflected wave signal according to a change in the position of the measurement target (for example, the person 10).

Specifically, the first signal is a signal (reflected wave signal) of the radio wave reflected by the measurement target at the position corresponding to the midpoint between each of the first transmission antenna and the third transmission antenna and each of the plurality of reception antennas in a case where radio waves are transmitted from the first transmission antenna and the third transmission antenna. Further, the second signal is a signal (reflected wave signal) of the radio wave reflected by the measurement target at the position corresponding to the midpoint between each of the second transmission antenna and the fourth transmission antenna and each of the plurality of reception antennas in a case where radio waves are transmitted from the second transmission antenna and the fourth transmission antenna.

As described above, in this embodiment, the height of the virtual antenna array can be changed (adjusted) by a pair of the transmission antenna and the reception antenna in which a radio wave is transmitted (that is, switching the transmission antenna for transmitting a radio wave). Thus, it is possible to acquire the reflected wave signal according to the change in the vertical direction of the measurement target passing in front of the panel 2 and to generate an inspection image with high accuracy.

In this embodiment, the security inspection can be performed only by the measurement target passing in front of the panel 2, and thus, the security inspection can be sequentially performed on a plurality of persons 10 walking, for example. Further, in this embodiment, sparse transmission antennas and reception antennas arranged sparsely are used, and thus the number of antennas can be reduced, and downsizing can be realized as compared with a technology called SAR. Further, in this embodiment, it is possible to set the interval between the plurality of reception antennas to, for example, about twice the half wavelength, and thus, the influence of interference of radio waves or the like can be reduced as compared with a case where the reception antennas are arranged at intervals of the half wavelength.

The system 1 according to this embodiment includes the sensor 3 and can acquire the position (the first position and the second position) of the measurement target as the motion information of the measurement target based on the sensor data by receiving the sensor data from the sensor 3. In this embodiment, with such a configuration, it is possible to transmit a radio wave from an appropriate transmission antenna according to the position of the measurement target and to obtain a reflected wave signal for generating an inspection image with high accuracy.

Incidentally, in this embodiment, the description is mainly given assuming that the sensor 3 is a camera. However, the sensor 3 may be, for example, a lidar (a radar using laser light) or another sensor such as an infrared camera as long as it is used to acquire the motion information of the measurement target.

In this embodiment, the distance by which the measurement target moves may be acquired as the motion information of the measurement target, and the panel 2 may be controlled such that a radio wave is transmitted from the transmission antenna while the measurement target moves by a predetermined distance based on the distance. Further, in this embodiment, the speed at which the measurement target moves may be acquired as the motion information of the measurement target, and the first period in which radio waves are transmitted from the first transmission antenna and the third transmission antenna and the second period in which radio waves are transmitted from the second transmission antenna and the fourth transmission antenna may be determined based on the speed. According to such a configuration, it is possible to appropriately transmit a radio wave from the transmission antenna when the measurement target passes in front of the panel 2.

In this embodiment, no radio wave is transmitted from the second transmission antenna and the fourth transmission antenna in a case where the measurement target is positioned at the first position, and no radio wave is transmitted from the first transmission antenna and the third transmission antenna in a case where the measurement target is positioned at the second position. In this embodiment, with such a configuration, the amount of communication between the panel 2 and the electronic apparatus 4 can be reduced, and the processing load on the reflected wave signal received from the panel 2 can be reduced.

In this embodiment, the inspection image is displayed. However, the inspection image may be displayed to be superimposed on, for example, an image, which includes the measurement target, captured by a camera (imaging device). According to such a configuration, it is possible to improve a visibility with respect to the measurement target in the inspection image.

In this embodiment, the type of the object possessed by the measurement target (for example, the person 10) may be discriminated based on the inspection image. According to such a configuration, for example, it is possible to notify the inspector of the security inspection that the person 10 possesses a dangerous article.

In this embodiment, the description is mainly given assuming that the inspection image is generated as the information of the measurement target. However, the information of the measurement target may be, for example, other than an image as long as it is useful for inspecting the measurement target.

Incidentally, the description is given assuming that the system 1 according to this embodiment includes at least one panel 2 provided at the position through which the measurement target passes, end the first transmission antenna array 21a, the second transmission antenna array 21b, and the reception antenna array 22 are installed on the panel 2 as illustrated in FIG. 8. However, the transmission antenna array and the reception antenna array may be interchanged.

Figure 13:
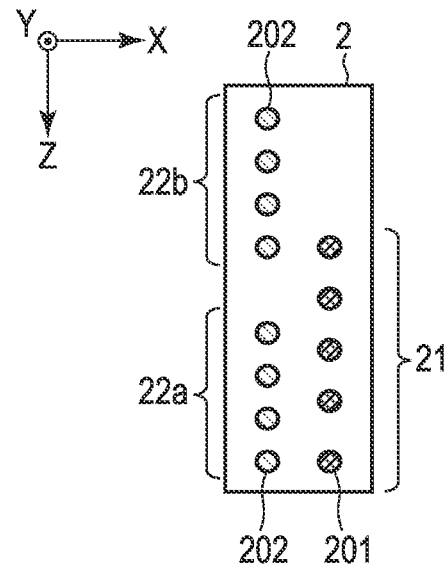
FIG. 13 is a view illustrating another example of the configuration of the panel.

Specifically, as illustrated in FIG. 13, the transmission antenna array 21, the first reception antenna array 22a, and the second reception antenna array 22b may be installed in the panel 2.

In this case, the transmission antenna array 21 includes a plurality of (for example, five) transmission antennas 201 capable of transmitting radio waves. In the transmission antenna array 21, the five transmission antennas 201 are arranged (arrayed) to be positioned on the same straight line extending in the Z direction. Further, in such a panel 2, the transmission antennas 201 are arranged at equal intervals.

Each of the first reception antenna array 22a and the second reception antenna array 22b includes a plurality of (for example, four) reception antennas 202 capable of receiving radio waves. The four reception antennas 202 configuring the first reception antenna array 22a and the four reception antennas 202 configuring the second reception antenna array 22b are arranged (arrayed) to be positioned on the same straight line extending in the Z direction different from the straight line on which the plurality of transmission antennas 201 are arranged. Further, in such a panel 2, the plurality of reception antennas 202 are arranged such that each interval (distance) of the four, reception antennas 202 configuring the first: reception antenna array 22a and each interval (distance) of the four reception antennas 202 configuring the second reception antenna array 22b are the same.

Incidentally, the configuration of the panel 2 illustrated in FIG. 13 is similar to that of the panel 2 described in FIG. 8 except that the first reception antenna array 22a and the second reception antenna array 22b are installed instead of the first transmission antenna array 21a and the second transmission antenna array 21b illustrated in FIG. 8, and the transmission antenna array 21 is installed instead of the reception antenna array 22.

Here, in the panel 2 illustrated in FIG. 8, the plurality of reception antennas 202 configuring the reception antenna array 22 are brought into a state capable of receiving radio waves, and the transmission antenna 201 which transmits a radio wave is switched in each of the first transmission antenna array 21a and the second transmission antenna array 21b, thereby changing the position (height) of the virtual antenna array 20.

On the other hand, in the panel 2 illustrated in FIG. 13, one of the plurality of reception antennas 202 configuring the first reception antenna array 22 and one of the plurality of reception antennas 202 configuring the second reception antenna array 22b are set in a state capable of receiving radio waves, and the plurality of transmission antennas 201 configuring the transmission antenna array 21 operate to sequentially transmit radio waves. According to such a configuration, by switching the reception antennas 202 which receive radio waves (reflected waves) in the first reception antenna array 22a and the second reception antenna array 22b, virtual antenna arrays having different positions (heights) can be realized similarly to the virtual antenna array 20 described above.

Although detailed description is omitted, for example, in a case where the lowermost reception antenna 202 among the four reception antennas 202 configuring the first reception antenna array 22a and the lowermost reception antenna 202 among the four reception antennas 202 configuring the second reception antenna array 22b are in a state capable of receiving radio waves, a radio wave is sequentially transmitted from each of the five transmission antennas 201 configuring the transmission antenna array 21, whereby a virtual antenna array similar to the virtual antenna array 20 illustrated in the frame 501 illustrated in FIG. 10 is realized.

For example, in a case where the second reception antenna 202 from the bottom among the four reception antennas 202 configuring the first reception antenna array 22a and the second reception antenna 202 from the bottom among the four reception antennas 202 configuring the second reception antenna array 22b are in a state capable of receiving radio waves, a radio wave is sequentially transmitted from each of the five transmission antennas 201 configuring the transmission antenna array 21, whereby a virtual antenna array similar to the virtual antenna array 20 illustrated in the frame 502 illustrated in FIG. 10 is realized.

For example, in a case where the third reception antenna 202 from the bottom among the four reception antennas 202 configuring the first reception antenna array 22a and the third reception antenna 202 from the bottom among the four reception antennas 202 configuring the second reception antenna array 22b are in a state capable of receiving radio waves, a radio wave is sequentially transmitted from each of the five transmission antennas 201 configuring the transmission antenna array 21, whereby a virtual antenna array similar to the virtual antenna array 20 illustrated in the frame 503 illustrated in FIG. 10 is realized.

For example, in a case where the fourth reception antenna 202 (that is, the uppermost portion) from the bottom among the four reception antennas 202 configuring the first reception antenna array 22a and the fourth reception antenna 202 (that is, the uppermost portion) from the bottom among the four reception antennas 202 configuring the second reception antenna array 22b are in a state capable of receiving radio waves, a radio wave is sequentially transmitted from each of the five transmission antennas 201 configuring the transmission antenna array 21, whereby a virtual antenna array similar to the virtual antenna array 20 illustrated in the frame 504 illustrated in FIG. 10 is realized.

Here, the description is given assuming that each of the first reception antenna array 22a and the second reception antenna array 22b includes four reception antennas 202.

However, each of the first reception antenna array 22*a* and the second reception antenna array 22*b* may include at least two reception antennas 202. Further, here, the description is given assuming that the transmission antenna array 21 includes the five transmission antennas 201. However, the transmission antenna array 21 may include one transmission antenna 201 or may include a plurality of transmission antennas 201.

As described above, in this embodiment, even in a case where the transmission antenna array 21 (a plurality of transmission antennas), the first reception antenna array 22*a*, and the second reception antenna array 22*b* (fox example, the first to fourth reception antennas) are installed on the panel 2, the effects described in this embodiment described above can be realized.

In this embodiment, the panel 2 may include a movable mechanism. Incidentally, in a case where the system 1 includes two panels 2, the panels 2 may be provided at positions facing each other as illustrated in FIG. 1, or may be provided at positions different from each other.

In a case where the system 1 includes two panels 2 as described above, the two panels may have similar configurations or different configurations.

In a case where the two panels 2 have different configurations, one of the two panels 2 may be configured as illustrated in FIG. 8, and the other may be configured as illustrated in FIG. 13. Further, a plurality of transmission antennas (for example, the first transmission antenna array 21*a* and the second transmission antenna array 21*b* illustrated in FIG. 8) may be installed on one of the two panels, and a plurality of reception antennas (the reception antenna array 22 illustrated in FIG. 8) may be installed on the other panel.

According to such a configuration, the radio wave transmitted from the transmission antenna installed in one panel 2 passes through the measurement target (for example, the person 10) passing between the two panels 2, and is received by the reception antenna installed in the other panel 2. In this case, the electronic apparatus 4 can generate the inspection image based on the signal of the radio wave (transmitted wave) received by the reception antenna.

In this embodiment, even with such a configuration, the reflected wave signal according to the change in the height direction of the measurement target (for example, the person 10) of the measurement target can be acquired by switching the transmission antenna which transmits a radio wave.

Incidentally, the transmission antenna array 21 illustrated in FIG. 13 may be installed on one panel 2, and the first reception antenna array 22*a* and the second reception antenna array 22*b* illustrated in FIG. 13 may be installed on the other panel 2.

Second Embodiment

Figure 14:
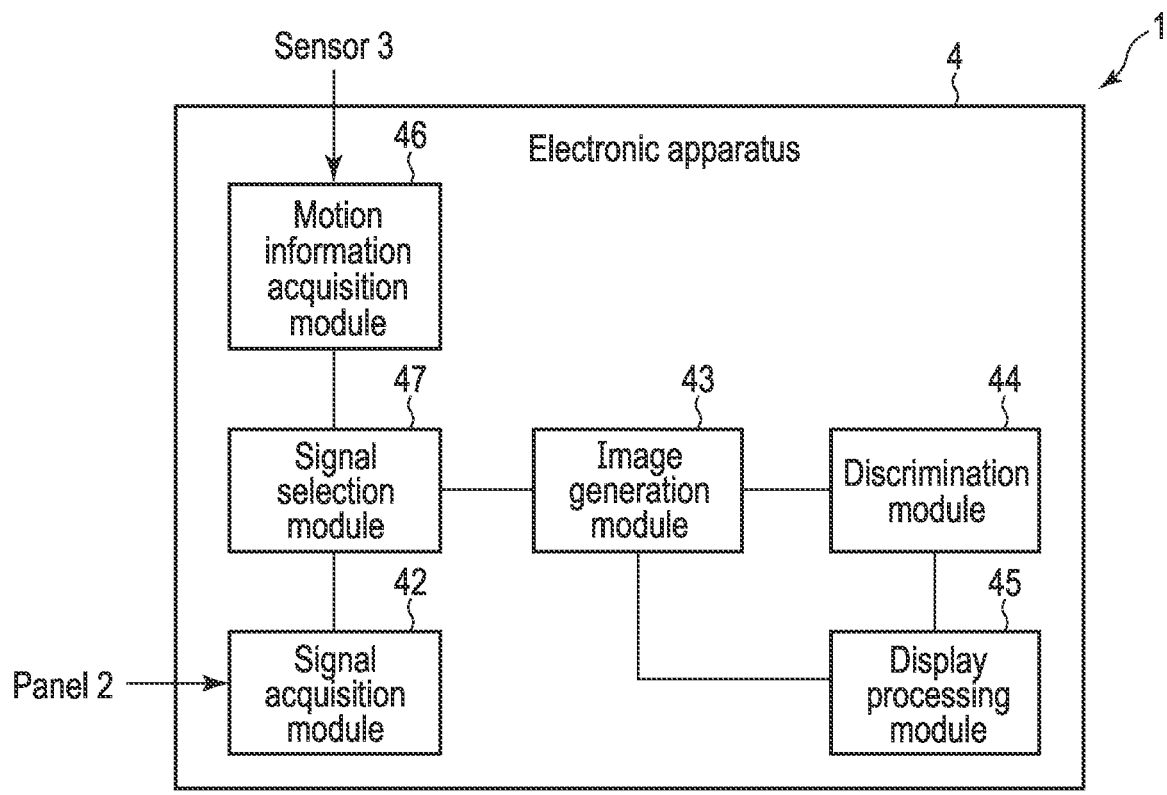
FIG. 14 is a block diagram illustrating an example of a functional configuration of a system according to a second embodiment.

Next, a second embodiment will be described. FIG. 14 is a block diagram illustrating an example of a functional configuration of a system according to the second embodiment. Here, a functional configuration of an electronic apparatus included in the system according to this embodiment will be mainly described. However, the same reference numerals are given to the same parts as those in FIG. 2 described above, detailed description thereof is omitted, and parts different from those in FIG. 2 will be mainly described.

Incidentally, a usage mode of a system 1 according to this embodiment, a configuration of a panel 2 included in the system 1, and the like are similar to those of the first embodiment described above, and thus, will be appropriately described with reference to FIGS. 1 and 8, and the like.

As illustrated in FIG. 2, an electronic apparatus 4 includes a motion information acquisition module 46 and a signal selection module 47 in addition to the signal reception module 42, the image generation module 43, the discrimination module 44, and the display processing module 45 described in the first embodiment described above.

Here, in the first embodiment described above, the description is given assuming that the panel control module 41 controls the panel 2 (that is, switches the transmission antenna 201 which transmits a radio wave) based on the motion information of the person 10. However, this embodiment is different from the first embodiment described above in that all transmission antennas 201 installed in the panel 2 sequentially transmit radio waves in a predetermined period.

In this case, the signal reception module 42 receives, from the panel 2, the reflected wave signal (the signal of the reflected wave from the person 10 received by the reception antenna 201) based on the radio wave transmitted from each of transmission antennas 202 installed in the panel 2.

In other words, in the first embodiment described above, the panel 2 is controlled based on the motion information (position) of the person 10, for example, such that a radio wave is transmitted from the first transmission antenna 201 of each of the first transmission antenna array 21*a* and the second transmission antenna array 22*b*, and the reflected wave signal is received. However, in this embodiment, the reflected wave signal based on the radio wave transmitted from each of all the transmission antennas (first to fourth transmission antennas) 201 configuring a first transmission antenna array 21*a* and a second transmission antenna array 21*b* is received.

On the other hand, the motion information acquisition module 46 receives sensor data from the sensor 3 described above, for example, and acquires the motion information of the person 10 based on the sensor data.

As described above, the reflected wave signals received by the signal reception module 42 include the reflected wave signals based on the radio waves transmitted from all the transmission antennas 201 configuring the first transmission antenna array 21*a* and the second transmission antenna array 21*b*. However, such reflected wave signals also include, for example, a reflected wave signal which causes a deviation in the height direction of the person 10 in the inspection image (that is, reduces the accuracy of the inspection image) as described in the comparative example of the first embodiment.

Therefore, the signal selection module 47 selects an appropriate reflected wave signal from the reflected wave signals received by the signal reception module 42 based on the motion information (position) of the person 10 acquired by the motion information acquisition module 46. The reflected wave signal selected by the signal selection module 47 in this manner is used for the synthetic aperture process (that is, the generation of the inspection image).

Figure 15:
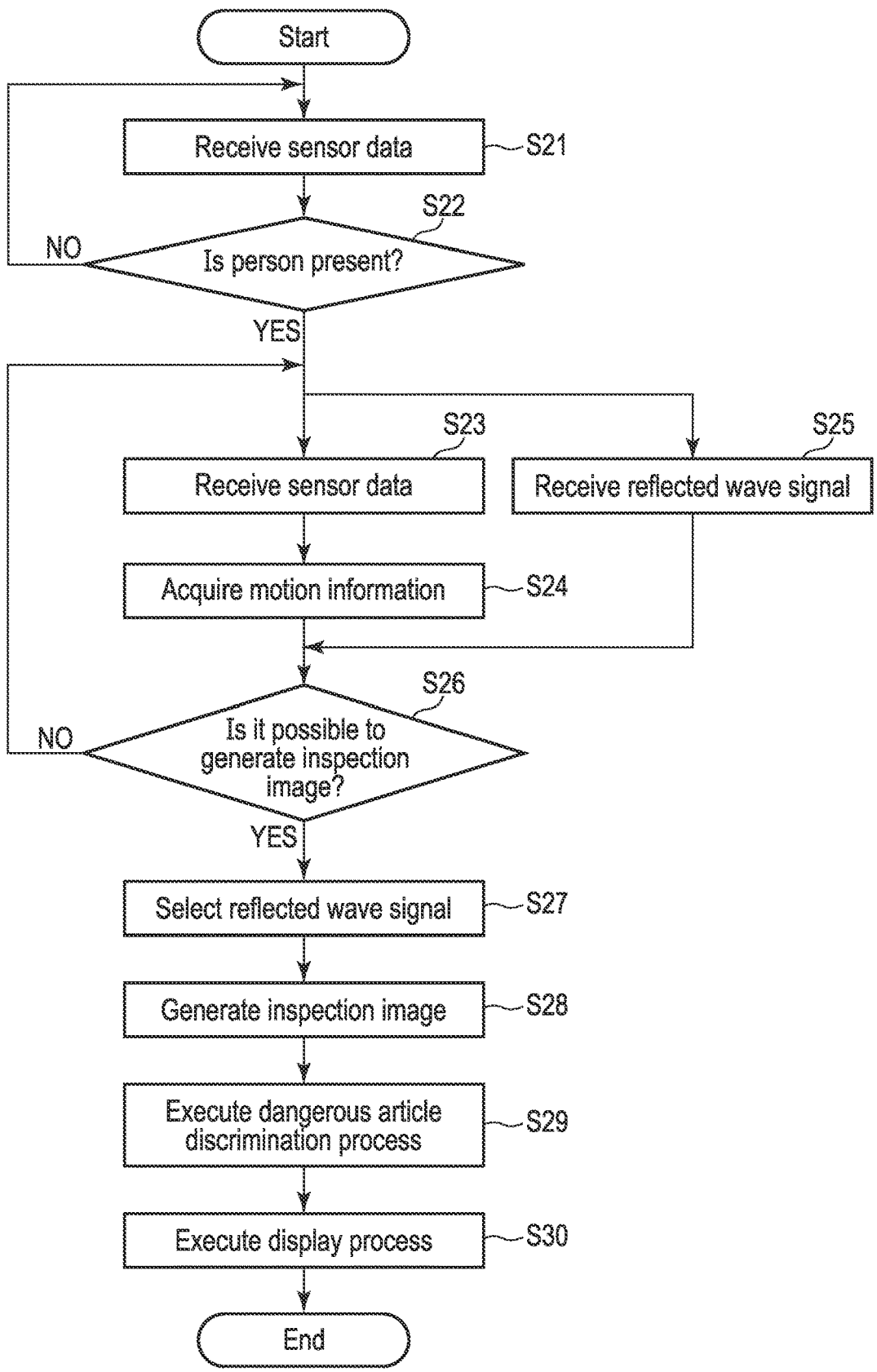
FIG. 15 is a flowchart illustrating an example of the processing procedure of the electronic apparatus provided in the system.

Next, an example of a processing procedure of the electronic apparatus 4 included in the system 1 according to this embodiment will be described with reference to a flowchart of FIG. 15.

First, the processing of steps S21 to S24 corresponding to the processing of steps S1 to S4 illustrated in FIG. 12 described above is executed.

Here, in this embodiment, it is assumed that the sensor 3 and the panel 2 operate to be synchronized. Therefore, the signal reception module 42 receives the reflected wave signal transmitted from the panel 2 at the same timing as the reception of the sensor data from the sensor 3 (step S25). In other words, in this embodiment, the processing of step S23 (and S24) and the processing of step S25 are executed in parallel.

Incidentally, the plurality of transmission antennas 201 installed on the panel 2 in this embodiment operates to sequentially transmit radio waves.

Here, assuming that each of the first transmission antenna array 21a and the second transmission antenna array 21b includes the first to fourth transmission antennas 201 as illustrated in FIG. 8 described above, first, a radio wave is sequentially transmitted from the first transmission antennas 201 of each of the first transmission antenna array 21a and the second transmission antenna array 21b, so that the signal reception module 42 receives the reflected wave signal (hereinafter, referred to as a first reflected wave signal) based on the radio wave transmitted from the first transmission antenna 201.

Next, when a radio wave is sequentially transmitted from the second transmission antennas 201 of each of the first transmission antenna array 21a and the second transmission antenna array 21b, the signal reception module 42 receives the reflected wave signal (hereinafter, referred to as a second reflected wave signal) based on the radio wave transmitted from the second transmission antenna 201.

When a radio wave is sequentially transmitted from the third transmission antennas 201 of each of the first transmission antenna array 21a and the second transmission antenna array 21b, the signal reception module 42 receives the reflected wave signal (hereinafter, referred to as a third reflected wave signal) based on the radio waves transmitted from the third transmission antennas 201.

When a radio wave is sequentially transmitted from the fourth transmission antenna 201 of each of the first transmission antenna array 21a and the second transmission antenna array 21b, the signal reception module 42 receives the reflected wave signal (hereinafter, referred to as a fourth reflected wave signal) based on the radio wave transmitted from the fourth transmission antenna 201.

That is, in the first embodiment described above, for example, only the reflected wave signal based on the radio wave transmitted from one (for example, the first transmission antenna 201 or the like) of the plurality of transmission antennas 201 configuring each of the first transmission antenna array 21a and the second transmission antenna array 21b at each timing such as the times t1 to t4 is received. However, in this embodiment, the reflected wave signals based on the radio waves transmitted from all the transmission antennas 201 configuring each of the first transmission antenna array 21a and the second transmission antenna array 21b at the timing are received.

In a case where steps S24 and S25 described above are executed, the motion information acquired in step S24 and the reflected wave signals (first to fourth reflected wave signals) received in step S25 are managed (held) in the signal selection module 47 in association with each other.

Next, the processing of step S26 corresponding to the processing of step S7 illustrated in FIG. 12 described above is executed.

In a case where it is determined in step S26 that the inspection image cannot be generated (NO in step S26), the procedure returns to step S23 (and S25), and the processing is repeated.

On the other hand, in a case where it is determined in step S26 that the inspection image can be generated (YES in step S26), the signal selection module 47 selects an appropriate reflected wave signal for generating the inspection image based on the motion information of the person 10 and the reflected wave signal managed in association with each other as described above (step S27).

Specifically, in a case where the first to fourth reflected wave signals are included in the reflected wave signals received in step S25, and the position (height) of the person 10 included in the motion information of the person 10 associated with the reflected wave signal is the position at the time t1 illustrated in FIG. 11 described above, the signal selection module 47 selects the first reflected wave signal from among the first to fourth reflected wave signals. Although a case where the first reflected wave signal is selected is described here, in step S27, the reflected wave signal may be selected based on the position of the person 10.

As described above, the processing of steps S23 to S25 is repeatedly executed. However, the processing of step S27 is executed for each (combination of) the motion information of the person 10 acquired in repeatedly-executed step S24 and the reflected wave signal received in repeatedly-executed step S25.

Incidentally, the processing (the selection of an appropriate reflected wave signal) of step S27 may be executed after the processing of steps S24 and S25 is executed (that is, before the processing in step S26 is executed).

When the processing of step S27 is executed, the processing of steps S28 to S30 corresponding to the processing of steps S8 to S10 illustrated in FIG. 12 described above is executed. Incidentally, in step S28, the synthetic aperture process may be executed based on the reflected wave signal selected in step S27.

Here, for convenience of description, assuming that the first transmission antenna array 21a includes two transmission antennas (first and second transmission antennas), and the second transmission antenna array 21b includes two transmission antennas (third and fourth transmission antennas) (that is, the system 1 includes the first to fourth transmission antennas), in this embodiment described above, the first signal based on the radio waves transmitted from the first transmission antenna and the third transmission antenna and the second signal based on the radio waves transmitted from the second transmission antenna and the fourth transmission antenna are acquired in the first period, and in a case where the measurement target is at the first position in the first period, the first signal is selected from the first signal and the second signal. Further, the first signal based on the radio wave transmitted from the first transmission antenna and the third transmission antenna and the second signal based on the radio wave transmitted from the second transmission antenna and the fourth transmission antenna are acquired in the second period, and in a case where the measurement target is positioned at the second position in the second period, the second signal is selected from the first signal and the second signal.

In this embodiment, with the above-described configuration, it is possible to generate an inspection image with high accuracy (obtain the information of the measurement target) based on the reflected wave signal according to a change in the position of the measurement target (for example, the person 10).

Incidentally, in the first embodiment described above, the panel 2 (the transmission antenna and the reception antenna) is controlled such that the reflected wave signal according to the change in the position of the measurement target can be received. On the other hand, this embodiment is different in that the reflected wave signals based on the radio waves transmitted from all the transmission antennas are received (collected), and an appropriate reflected wave signal (that is, the reflected wave signal according to the change in the position of the measurement object) is selected from the reflected wave signals when the inspection image is generated.

Therefore, in the first embodiment described above, it is described that the amount of communication between the panel 2 and the electronic apparatus 4 can be reduced. However, in this embodiment, the amount of communication between the panel 2 and the electronic apparatus 4 is larger than that in the first embodiment. However, in this embodiment, it is not necessary to control the panel 2 based on the motion information of the person 10, and thus, it is possible to reduce the load of processing (the switching of the transmission antenna which transmits a radio wave, and the like) on the panel 2 side.

Incidentally, this embodiment is similar to the first embodiment described above except for the points described above, and can achieve the same effects as the first embodiment.

In the first embodiment described above, the description is given that the panel 2 may have the configuration illustrated in FIG. 13, for example. However, in this embodiment, the panel 2 may have the configuration illustrated in FIG. 13. Although detailed description is omitted, in this embodiment, in the case where the panel 2 has the configuration illustrated in FIG. 13, while the reception antennas 202 which receive radio waves in each of the first reception antenna array 22a and the second reception antenna array 22b are sequentially switched, the signals of the radio waves (reflected waves) received by all the reception antennas 202 may be received by the electronic apparatus (signal reception module 42), and an appropriate signal may be selected from the signals (reflected wave signals) to generate the inspection image.

According to at least one embodiment described above, it is possible to provide a system and a method capable of obtaining highly accurate information of a measurement target.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A system comprising:
   first to fourth transmission antennas;
   a plurality of reception antennas; and
   a processor configured to:
   acquire a first position of a measurement target moving in a traveling direction;
   acquire a first signal of radio waves which are transmitted by the first transmission antenna and the third transmission antenna, reflected by the measurement target, and received by the reception antennas in a case where the first position is acquired;
   acquire a second position of the measurement target, the second position being different from the first position;
   acquire a second signal of radio waves which are transmitted by the second transmission antenna and the fourth transmission antenna, reflected by the measurement target, and received by the reception antennas in a case where the second position is acquired; and
   generate a first image by executing a synthetic aperture process using the first signal and the second signal,
   wherein
   the first to fourth transmission antennas are provided along a first direction that intersects with the traveling direction,
   the plurality of reception antennas are provided along the first direction,
   a first interval between the first transmission antenna and the third transmission antenna and a second interval between the second transmission antenna and the fourth transmission antenna are the same,
   a position of the first transmission antenna is different from a position of the second transmission antenna in the first direction, and
   a position of the third transmission antenna is different from a position of the fourth transmission antenna in the first direction,
   the first position is different from the second position in the first direction,
   the first direction is a vertical direction,
   the first transmission antenna is lower than the second transmission antenna in the vertical direction,
   the third transmission antenna is lower than the fourth transmission antenna in the vertical direction, and
   the first position is lower than the second position in the vertical direction.

2. The system according to claim 1, wherein
   the processor is configured to:
   cause the first transmission antenna and the third transmission antenna to transmit radio waves in a first period in a case where a position of the measurement target is the first position in the first period, and
   cause the second transmission antenna and the fourth transmission antenna to transmit radio waves in a second period different from the first period in a case where the position of the measurement target is the second position in the second period.

3. The system according to claim 1, wherein
   the position of the second transmission antenna is separated by a first distance in the first direction from the position of the first transmission antenna, and
   the position of the fourth transmission antenna is separated by the first distance in the first direction from the position of the third transmission antenna.

4. The system according to claim 1, wherein
   the processor is configured to acquire a distance by which the measurement target moves, and
   the radio wave is transmitted based on the acquired distance while the measurement target moves a predetermined distance.

5. The system according to claim 1, wherein
   the processor is configured to acquire a speed at which the measurement target moves, and
   a first period in which radio waves are transmitted from the first transmission antenna and the third transmission antenna and a second period in which radio waves are transmitted from the second transmission antenna and the fourth transmission antenna are determined based on the acquired speed.

6. The system according to claim 1, wherein
   in a case where the measurement target is at the first position, the radio wave is not transmitted from the second transmission antenna and the fourth transmission antenna, and in a case where the measurement target is at the second position, the radio wave is not transmitted from the first transmission antenna and the third transmission antenna.

7. The system according to claim 1, wherein the processor is configured to:
acquire the first signal of the radio waves which are transmitted by the first transmission antenna and the third transmission antenna, reflected by the measurement target, and received by the reception antennas and the second signal of the radio waves which are transmitted by the second transmission antenna and the fourth transmission antenna, reflected by the measurement target, and received by the reception antennas in a first period, and select the first signal from the first signal and the second signal in a case where the measurement target is at the first position in the first period; and
acquire the first signal and the second signal in a second period different from the first period and select the second signal from the first signal and the second signal in a case where the measurement target is at the second position in the second period.

8. The system according to claim 1, wherein
the processor is configured to display the first image.

9. The system according to claim 8, wherein
the processor is configured to display the first image to be superimposed on a second image, which includes the measurement target, captured by an imaging device.

10. The system according to claim 1, further comprising:
at least a panel provided at a position through which the measurement target passes,
wherein
the first to fourth transmission antennas and the reception antennas are installed on the panel.

11. The system according to claim 1, wherein
the first signal is a signal of a radio wave which is reflected by the measurement target at a position corresponding to a midpoint between each of the first transmission antenna and the third transmission antenna and each of the reception antennas in a case where the radio waves are transmitted from the first transmission antenna and the third transmission antenna, and
the second signal is a signal of a radio wave which is reflected by the measurement target at a position corresponding to a midpoint between each of the second transmission antenna and the fourth transmission antenna and each of the reception antennas in a case where the radio waves are transmitted from the second transmission antenna and the fourth transmission antenna.

12. The system according to claim 1, wherein
the processor is configured to discriminate a type of an object possessed by the measurement target based on the first image.

13. A system comprising:
a plurality of transmission antennas;
first to fourth reception antennas; and
a processor configured to:
acquire a first position of a measurement target moving in a traveling direction;
acquire a first signal of radio waves which are transmitted by the transmission antennas, reflected by the measurement target, and received by the first reception antenna and the third reception antenna in a case where the first position is acquired;
acquire a second position of the measurement target, the second position being different from the first position;
acquire a second signal of radio waves which are transmitted by the transmission antennas, reflected by the measurement target, and received by the second reception antenna and the fourth reception antenna in a case where the second position is acquired; and
generate a first image by executing a synthetic aperture process using the first signal and the second signal,
wherein
the plurality of transmission antennas are provided along a first direction that intersects with the traveling direction,
the first to fourth reception antennas are provided along the first direction,
a first interval between the first reception antenna and the third reception antenna and a second interval between the second reception antenna and the fourth reception antenna are the same,
a position of the first reception antenna is different from a position of the second reception antenna in the first direction,
a position of the third reception antenna is different from a position of the fourth transmission antenna in the first direction,
the first position is different from the second position in the first direction, the first direction is a vertical direction,
the first reception antenna is lower than the second reception antenna in the vertical direction,
the third reception antenna is lower than the fourth reception antenna in the vertical direction, and
the first position is lower than the second position in the vertical direction.

14. The system according to claim 13, wherein
the processor is configured to:
cause the first reception antenna and the third reception antenna to receive radio waves in a first period in a case where a position of the measurement target is the first position in the first period, and
cause the second reception antenna and the fourth reception antenna to receive radio waves in a second period different from the first period in a case where the position of the measurement target is the second position in the second period.

15. The system according to claim 13, wherein
the position of the second reception antenna is separated by a first distance in the first direction from the position of the first reception antenna, and
the position of the fourth reception antenna is separated by the first distance in the first direction from the position of the third reception antenna.

16. The system according to claim 13, wherein
the processor is configured to acquire a distance by which the measurement target moves, and
the radio wave is transmitted based on the acquired distance while the measurement target moves a predetermined distance.

17. The system according to claim 13, wherein
the processor is configured to acquire a speed at which the measurement target moves, and
a first period in which radio waves are received from the first reception antenna and the third reception antenna and a second period in which radio waves are received from the second reception antenna and the fourth reception antenna are determined based on the acquired speed.

18. The system according to claim 13, wherein
in a case where the measurement target is at the first position, the radio waves are not received by the second reception antenna and the fourth reception antenna, and
in a case where the measurement target is at the second position, the radio waves are not received by the first reception antenna and the third reception antenna.

* * * * *